United States Patent
Narel et al.

(10) Patent No.: US 8,385,035 B2
(45) Date of Patent: Feb. 26, 2013

(54) PROTECTION SYSTEM HAVING REDUCED ENERGY LET-THROUGH MODE AND ZONE SELECTIVITY

(75) Inventors: Radoslaw Narel, Plainville, CT (US); Thomas Frederick Papallo, Jr., Plainville, CT (US); Joseph Rao, Plainville, CT (US)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 12/837,958

(22) Filed: Jul. 16, 2010

(65) Prior Publication Data
US 2012/0014026 A1   Jan. 19, 2012

(51) Int. Cl.
*H02H 5/00* (2006.01)

(52) U.S. Cl. .......................... 361/62; 361/63

(58) Field of Classification Search ............... 361/42, 361/62–69
See application file for complete search history.

(56) References Cited

U.S. PATENT DOCUMENTS

| | | | |
|---|---|---|---|
| 3,103,270 A | 9/1963 | Tilbury | |
| 3,517,300 A | 6/1970 | McMurray | |
| 6,297,939 B1 | 10/2001 | Bilac et al. | |
| 6,356,422 B1 | 3/2002 | Bilac et al. | |
| 2007/0121265 A1* | 5/2007 | Hill et al. | 361/62 |
| 2007/0159746 A1 | 7/2007 | Sirivella et al. | |

FOREIGN PATENT DOCUMENTS
GB      535634 A     4/1941

* cited by examiner

*Primary Examiner* — Danny Nguyen
(74) *Attorney, Agent, or Firm* — Global Patent Operation; Stephen G. Midgley

(57) ABSTRACT

A method to protect a circuit having at least a first circuit breaker, and a second circuit breaker arranged upstream of said first circuit breaker, said first circuit breaker having configuration settings selectable between a normal mode and an alternate mode, the alternate mode setting including a reduced energy let-thru (RELT) mode setting having a RELT mode trip time delay. The method including determining if said first circuit breaker is configured in said RELT mode, determining a dynamic delay time for opening said second circuit breaker, wherein said dynamic delay time is based at least in part on said RELT mode trip time delay of said first circuit breaker, and triggering said second circuit breaker to open after said dynamic delay time has elapsed.

6 Claims, 3 Drawing Sheets

PROTECTION SYSTEM HAVING REDUCED ENERGY LET-THROUGH MODE AND ZONE SELECTIVITY

BACKGROUND OF THE INVENTION

Field of the Invention

The field of the invention relates generally to power distribution systems and more particularly, to a method and system for a circuit protection system providing dynamic delay times for circuit breakers throughout the system.

In power distribution systems, power is distributed to various loads and is typically divided into branch circuits, which supply power to specified loads. The branch circuits also can be connected to various other power distribution equipment.

Due to the concern of an abnormal power condition in the system, i.e., a fault, it is known to provide circuit protective devices, e.g., circuit breakers to protect the various loads, as well as the power distribution equipment. The circuit breakers seek to prevent or minimize damage and typically function automatically. The circuit breakers also seek to minimize the extent and duration of electrical service interruption in the event of a fault.

Circuit breakers are often used to protect against overcurrent faults by measuring a current in a protected circuit or branch, and tripping to cut off the current when the measured current exceeds a predetermined fault level. Conventional circuit breakers often employ microprocessor-based digital solid-state trip units to generate an inverse time long delay and/or short delay trip such as by digital simulation of the heating and cooling of a bimetallic strip. Such conventional circuit breaker trip units store in a memory a digital value which simulates the temperature of the bimetallic strip. The memory may be a Random Access Memory (RAM) such as an accumulator-type memory. When the measured current exceeds a predetermined pick-up level, the circuit breaker trip unit is considered to be in "pick-up" mode, and a stored value, or accumulator, is incremented by a predetermined amount, such as for example, by a factor of the square of the current. Conversely, if the measured current is lower than the predetermined pick-up level, the stored value or accumulator is decremented by a predetermined amount. In the event that the stored or accumulator value exceeds a predetermined maximum value, the circuit breaker trip unit will determine a fault exists and issue a trip signal to clear the fault.

It is known to utilize Zone Selective Interlocking (ZSI), or zone restraint, techniques to reduce stress on electrical equipment. ZSI utilizes upstream circuit breakers having pre-programmed time delays so that the downstream circuit breakers are provided with an opportunity to clear the fault without intentional delay before the upstream circuit breaker opens or trips.

In a known zone selective interlock (ZSI) system, a downstream circuit breaker can be in direct communication with an upstream circuit breaker through wiring such that the downstream circuit breaker sends a signal to the upstream circuit breaker placing the upstream circuit breaker in a restrained mode. In the restrained mode, the circuit breaker temporarily restrains from opening or tripping until after a pre-determined time delay has timed out. Conventional circuit breakers each have pre-programmed time delay settings incorporated therein. Thus, a ZSI system provides an additional time delay based upon a pre-set, invariable time period, such as, for example 100 milliseconds (ms), applied to each upstream circuit breaker. Thus, each affected upstream circuit breaker will delay tripping by the pre-set period of time regardless of the location of the fault in the power distribution system.

More specifically, in a selectively coordinated protective system with conventional ZSI, when a downstream breaker detects a current greater than its ground fault (GF) pick-up, short time (ST) pick-up or its instantaneous (I) pick-up, it will send a restraint signal back to the upstream breaker. The upstream circuit breaker, upon seeing the restraint signal, will time out for the ZSI restraint period, and then begin to time out based on its trip time-delay-trip setting.

In a first scenario, if the downstream breaker operates properly it will trip, thereby clearing the fault. Further, the upstream circuit breaker will stop timing its GF or ST time-delay-trip setting and, thus, will not trip. In this first scenario, the downstream circuit breaker cleared the fault and a minimal number of feeders were affected.

In a second scenario, if the downstream breaker detects the fault and sends a restraint signal to the upstream breaker but the downstream breaker does not operate properly to clear the fault the GF or ST time-delay-trip setting on the upstream breaker will time out and the upstream breaker will trip thereby clearing the fault. Thus, the upstream breaker acts as a backup breaker to the downstream breaker in the event that the downstream breaker does not operate properly. In this second scenario, however, all circuit breakers downstream from the tripped upstream circuit breaker are de-energized.

In a third scenario, if the upstream breaker with a conventional ZSI function detects a GF or ST fault and does not receive a ZSI restraint signal from a downstream breaker, the upstream breaker will assume that the fault is in its protection zone (ahead of the next layer of downstream circuit breakers) and will trip with minimal time delay thereby quickly clearing the fault.

It is also known to utilize ZSI techniques in a centrally controlled protection system. For example, a protection system using a central control processing unit (CCPU) to determine a dynamic delay time for opening a circuit breaker if a fault is detected in the circuit is described in more detail in U.S. Pat. No. 7,254,001 titled "Circuit Protection System" assigned to the assignee of the present invention and incorporated by reference herein in its entirety.

For example, in such centrally controlled protection systems, a ZSI routine functions to provide the circuit breaker nearest the fault with sufficient time to attempt to clear the fault before the upstream circuit breaker is opened, and the next upstream circuit breaker is provided with an open command at an adjusted or dynamic delay time that elapses before that circuit breaker is opened. The conventional ZSI routine is an algorithm, or the like, performed by the CCPU. The CCPU determines the dynamic delay times for the opening of any number of upstream circuit breakers and provides open or actuation commands to open the circuit breakers at the dynamic delay times.

The modified dynamic delay time for the opening of the upstream circuit breaker is conventionally based upon the location of the fault with respect to the circuit breakers and/or other devices and topology of system, and is determined from the sum of a pre-defined delay time and the clearing time of downstream circuit breaker. For example, in a conventional ZSI system, if a feeder circuit breaker is in pick-up and is set with normal mode trip time delay of 58 ms, then a sub-main circuit breaker directly upstream from the feeder circuit breaker will be set with a time-delay of the feeder circuit breaker's normal mode trip time-delay increased by 100 ms of zone selectivity delay (i.e., 158 ms total delay). Similarly, a main breaker directly upstream from the sub-main circuit breaker will be set with the feeder circuit breaker's trip time-delay (58 ms) increased by the first tier sub-main selectivity delay (100 ms), plus an additional 100 ms of the second tier main circuit breaker selectivity delay, for a total trip time-delay of 258 ms.

Conventional power distribution systems also typically include access points, for example, switchgear units having a plurality of circuit breakers for controlling the flow of power through the system and protecting the system, such as, by providing fault protection. Service personnel may need to access these different points to perform maintenance, service, diagnosis, etc. Occasionally, this work is performed on energized equipment due to necessity. The potential energy of typical switchgear is such that in the event of a fault an arch flash will occur resulting in damage to equipment and/or serious harm or death to service personnel can occur.

In order to increase safety to personnel working on (and around) these systems, while also maintaining power through the system, it is known to provide localized safety measures. For example, it is known to increase fault sensitivity in a breaker near a service personnel or operator such as through an alternate trip setting for a reduced energy let-thru (RELT) mode or maintenance mode.

It is further known that a conventional protection system can provide both a normal mode protection settings and reduced energy let-through mode protection settings. For example, a protection system using a central control processing unit to control a plurality of circuit breakers in either a normal mode or a reduced energy let-through mode is described in more detail in U.S. Pat. No. 7,751,165 titled "Centrally Controlled Protection Systems Having Reduced Energy Let-Through Mode", assigned to the assignee of the present invention and incorporated by reference herein in its entirety.

A conventional protection system can include a reduced energy let-through (RELT) mode, which reduces the amount of energy that is let through portions of the power distribution system as needed. For example, one or more protective devices in conventional protection system can be placed into the reduced energy let-through mode during activities such as maintenance or when an operator is in close proximity to various components in the power distribution system.

However, in some cases, the fault sensitivity of a circuit breaker that is also part of a ZSI system may be increased, such as through an alternate trip setting for a reduced energy let-thru (RELT) mode.

In a conventional centrally controlled protection system applying ZSI, when a first circuit breaker enters a pick-up mode, and the first circuit breaker is downstream of a second circuit breaker operating in a RELT mode, the trip time delay for the second upstream circuit breaker operating in a RELT mode may be adjusted to add the ZSI selectivity delay. Thus, in this case, the selectivity time delay applied to the second upstream circuit breaker thus resulting in maintained selectivity, but with a loss of RELT sensitivity. As such, a conventional ZSI function, while effective at providing selectivity in a power distribution system, compromises the reduced energy sensitivity normally provided by the RELT functions of circuit breakers in the power distribution system. Thus, conventional methods and systems that add ZSI delays to RELT mode sensitivity settings can result in an undesired loss of selectivity in the system and/or increased energy let-through.

Conversely, in a conventional centrally controlled protection system applying ZSI, when a first circuit breaker operating in a RELT mode enters a pick-up mode, and the first circuit breaker is downstream of a second circuit breaker, the ZSI time delay between the first downstream circuit breaker and the second upstream circuit breaker may be set to zero. As such, conventional systems and methods, while effective at reducing the energy let-through in a power distribution system, may compromise the selectivity normally provided by the ZSI functions of the circuit breakers in the power distribution system. Thus, conventional techniques that apply RELT mode sensitivity settings in ZSI systems can result in an undesired loss of selectivity in the system.

BRIEF SUMMARY OF THE INVENTION

Methods and systems of varying scope are shown and described herein. In addition to the advantages described above, further advantages and/or adaptations or variations will become apparent by reference to the drawings and by reading the remaining portions of the specification.

In operation, embodiments of the invention provide methods and systems to protect a circuit having at least a first circuit breaker, and a second circuit breaker arranged directly upstream of said first circuit breaker, said first circuit breaker having configuration settings selectable between a normal mode and an alternate mode, the alternate mode setting including a reduced energy let-thru (RELT) mode setting having a RELT mode trip time delay, by determining if said first circuit breaker is configured in said RELT mode, determining a dynamic delay time for opening said second circuit breaker, wherein said dynamic delay time is based at least in part on said RELT mode trip time delay of said first circuit breaker, and triggering said second circuit breaker to open after said dynamic delay time has elapsed.

Additionally embodiments of the invention provide methods and systems to protect a circuit having a first circuit breaker arranged directly downstream of a second circuit breaker, said first circuit breaker configured to provide a selectivity trip time-delay, said second circuit breaker having configuration settings selectable between a normal mode and an alternate mode, the alternate mode setting including a reduced energy let-thru (RELT) mode setting having a RELT mode trip time delay, the system comprising a network and at least one control processing unit configured to operatively control said first circuit breaker and said second circuit breaker, said network being communicatively coupled to said circuit, said first circuit breaker, said second circuit breaker and said at least one control processing unit, wherein said at least one control processing unit is configured to configured to open at least one of said first and said second circuit breakers if a fault is detected in said circuit, determine a dynamic delay time for opening said second circuit breaker if said fault is detected in said circuit, wherein said dynamic delay time is based at least in part on said RELT mode trip time delay of said first circuit breaker, determine if said first circuit breaker is set in said RELT mode, and if so, delay opening said second circuit breaker until after said dynamic delay time has elapsed.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

The following description makes reference to the accompanying drawings that form a part hereof, and in which is shown by way of illustration specific embodiments that may be practiced. It is understood that other embodiments may be utilized and that various changes can be made to the embodiments shown and described herein without departing from the patentable scope of the claims appended hereto. The following description is, therefore, not to be taken in a limiting sense.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Figure 1:
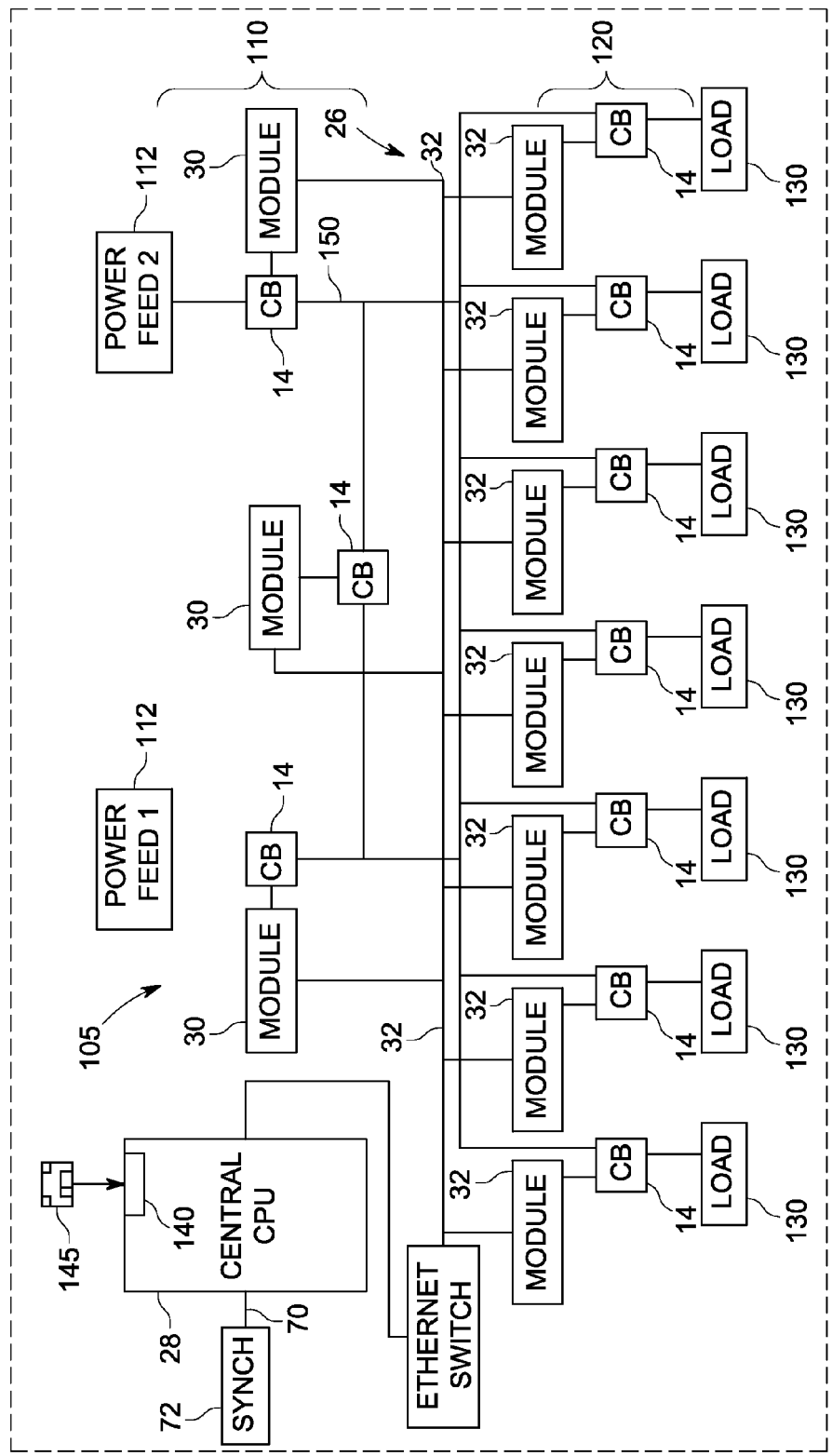
FIG. 1. is a schematic illustration of a multiple source power distribution system in accordance with an embodiment.

Referring to FIG. 1, an exemplary embodiment of a multi-source, multi-tier power distribution system generally referred to by reference numeral 105 is illustrated. System 105 distributes power from at least one power feed 112, in this embodiment a first and second power feed, through a power distribution bus 150 to a number or plurality of circuit breakers 14 and to a number or plurality of loads 130. CCPU 28 can include a data transmission device 140, such as, for example, a CD-ROM drive or floppy disk drive, for reading data or instructions from a medium 145, such as, for example, a CD-ROM or floppy disk.

Circuit breakers 14 are arranged in a layered, multi-leveled or multi-tiered configuration with a first level 110 of circuit breakers and a second level 120 of circuit breakers. Of course, any number of levels or configuration of circuit breakers 14 can be used with system 105. The layered configuration of circuit breakers 14 provides for circuit breakers in first level 110 which are upstream of circuit breakers in second level 120. In the event of an abnormal condition of power in system 105, i.e., a fault, protection system 26 seeks to coordinate the system by attempting to clear the fault with the nearest circuit breaker 14 upstream of the fault. Circuit breakers 14 upstream of the nearest circuit breaker to the fault remain closed unless the downstream circuit breaker is unable to clear the fault. Protection system 26 can be implemented for any abnormal condition or parameter of power in system 105, such as, for example, long time, short time or instantaneous overcurrents, or excessive ground currents.

In order to provide the circuit breaker 14 nearest the fault with sufficient time to attempt to clear the fault before the upstream circuit breaker is opened, the upstream circuit breaker is provided with an open command at an adjusted or dynamic delay time. The upstream circuit breaker 14 receive a signal indicative of an open command from CCPU 28 at a modified dynamic delay time that elapses before the circuit breaker is opened. In an exemplary embodiment, the modified dynamic delay time for the opening of the upstream circuit breaker 14 is based at least in part upon a RELT mode trip time of a downstream circuit breaker 14. CCPU 28 of protection system 26 can provide open commands at modified dynamic delay times for upstream circuit breakers 14 throughout power distribution system and the modified dynamic delay times for the opening of each of these circuit breakers can preferably be over an infinite range.

Figure 2:
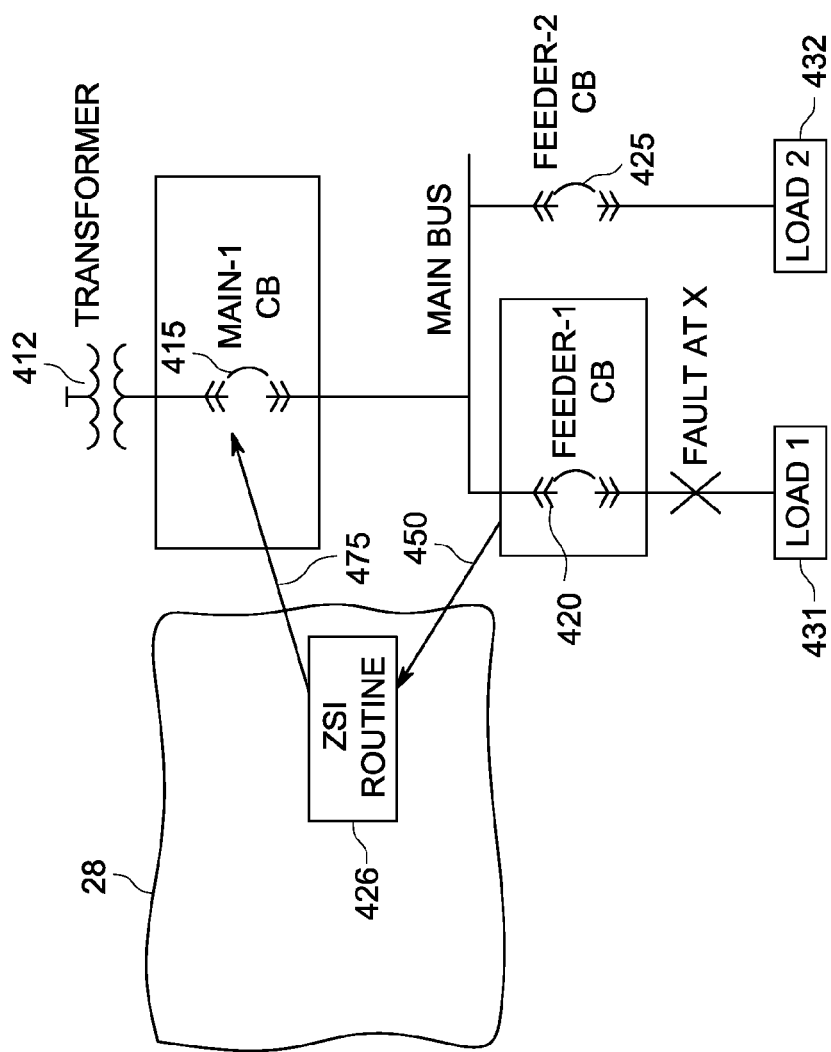
FIG. 2 is a schematic illustration of a portion of the power system of FIG. 1.

Referring to FIG. 2, an exemplary embodiment of a portion of power distribution system 105 having a two-tier circuit with a main-1 circuit breaker (CB) 415 upstream of feeder 1 CB 420 and feeder 2 CB 425, which are in parallel. Power flow is from transformer 412 through main-1 CB 415, feeder 1 CB 420 and feeder 2 CB 425, to loads 431, 432. In the event of a fault X occurring between feeder 1 CB 420 and load 431, the existence of the fault and the location of the fault is determined by CCPU 28 in the manner known in the art, such as that disclosed in U.S. Pat. No. 7,254,001 and as schematically represented by reference numeral 450. The nearest circuit breaker upstream of the fault X, i.e., feeder 1 CB 420, is placed into "pickup mode" by CCPU 28 and waits a pre-defined delay time before being opened. The modified dynamic delay time for the opening of main-1 CB 415 (the next nearest circuit breaker that is upstream of fault X) is then determined by zone selective interlock (ZSI) routine 426.

In an exemplary embodiment, ZSI routine 426 is an algorithm, or the like, performed by CCPU 28. CCPU 28 determines the dynamic delay times for the opening of any number of upstream circuit breakers 14 and provides open or actuation commands to open the circuit breakers at the dynamic delay times.

In an exemplary embodiment, the CCPU 28 determines if the main-1 CB 415 (the next nearest circuit breaker that is upstream of fault X) is operating in a RELT mode. If main-1 CB 415 is operating in a RELT mode, then the RELT mode time delay of main-1 CB 415 is maintained.

If CCPU 28 determines main-1 CB 415 is not operating in a RELT mode, then, the main-1 CB 415 dynamic trip time delay is determined by CCPU 28 by determining the sum of the pre-defined normal mode ZSI trip time-delay for the system, and the trip time-delay of feeder 1 CB 420.

The delay time for opening of main-1 CB 415 is then modified based upon the value determined by CCPU 28, as schematically represented by reference numeral 475. This allows feeder 1 CB 420 the optimal time to clear the fault X before main-1 CB 415 opens. The modified dynamic delay time determined by ZSI routine 426 reduces potential damage to system 105 by maintaining the selectivity of the system while allowing for increased sensitivity of a RELT mode at feeder 1 CB 420 to be maintained. The modified dynamic delay time also increases the efficiency of system 105 by delaying the opening of main-1 CB 415 for the optimal time period to provide the downstream circuit breaker, feeder 1 CB 420, with the full opportunity to clear the fault X so that other loads, i.e., load 432, can still receive power.

Of course, it is contemplated by the present disclosure that a power distribution system employing an embodiment may have any number of tiers or levels and any configuration of branch circuits. The zones of protection and the dynamic delay times can change as the power distribution system changes. In an alternate embodiment, ZSI routine 426 can additionally modify the dynamic delay time for opening of the upstream circuit breakers 14 based upon other factors using different algorithms.

Figure 3:
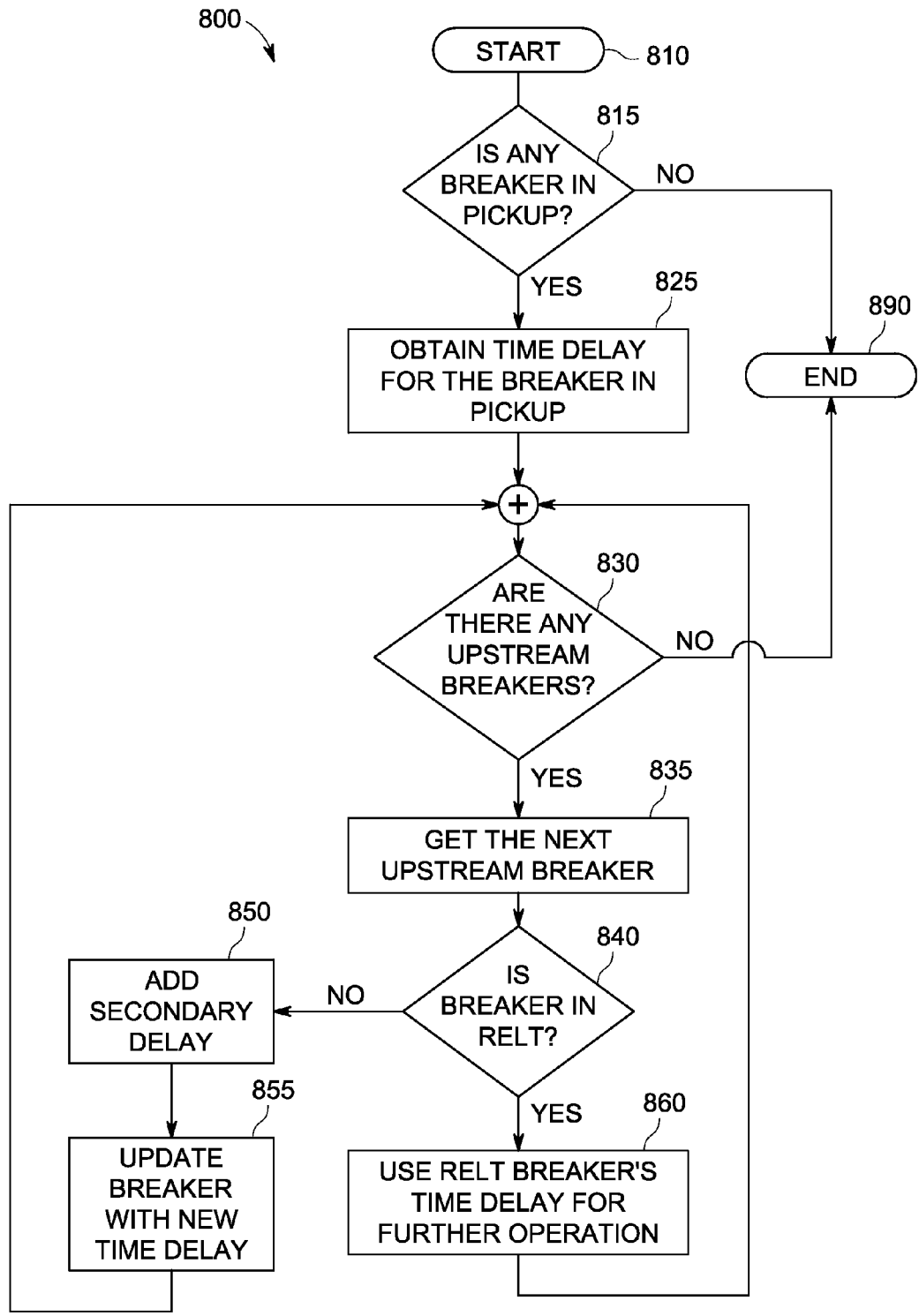
FIG. 3 is a flow diagram in accordance with an embodiment.

In operation, various embodiments of the invention include a method 800 as shown in FIG. 3 providing an improved RELT mode of operation for a plurality of circuit breakers in a Zone Selective Interlock arrangement in a power distribution system. For purposes of clarity and to simplify the description, an embodiment of method 800 is described for providing an improved RELT mode of operation for up to three circuit breakers disposed in a centrally controlled distribution system in series as part of a ZSI arrangement. However, the method is not limited to any specific number of circuit breakers, and it is further contemplated that an embodiment may involve any number of circuit breakers.

At 810, the method 800 begins, and at 815, it is determined if a first circuit breaker in the zone has detected a fault, for example by determining if any the first circuit breaker in the zone is in a pick-up mode. If so, at 820 the trip time-delay of the first circuit breaker in pick-up is determined. The trip time-delay of the first circuit breaker in pick-up may be one of, for example, a normal mode protection setting trip time-delay or a RELT mode protection setting trip time-delay, or other trip time-delay including, for example, ZSI trip time-delay due to a different fault occurring earlier in the same zone.

Thereafter, at 830, it is determined whether there is a second circuit breaker upstream of the first circuit breaker determined at 815 to be in pick-up. If there are no circuit breakers upstream from the first circuit breaker, then the first circuit breaker is allowed to trip after its determined trip time-delay.

If it is determined at 830 that there is a second circuit breaker upstream from the first circuit breaker, then at 835 the second circuit breaker upstream is identified. Thereafter, at 840, it is determined if the second circuit breaker upstream identified at 835 is in a RELT mode, and if so, then at 860 the RELT mode trip time-delay for the second circuit breaker upstream is determined.

If at 840, it was determined that the second circuit breaker upstream identified at 835 is not in a RELT mode, then at 850 the time-delay for the second circuit breaker upstream is determined by adding the normal mode ZSI trip time-delay for the second circuit breaker upstream, and the trip time-delay of the first circuit breaker determined at 825. Thereafter, at 855 the trip time-delay of the second circuit breaker upstream is updated to implement trip time-delay determined at 850.

Thereafter, the method then iteratively loops back and it is similarly determined at 830 if there is a third circuit breaker upstream from the second circuit breaker upstream.

If it is determined at 830 there is not a third circuit breaker upstream from the second circuit breaker upstream, then the second circuit breaker upstream is allowed to trip after its RELT mode trip time-delay, or, if the second circuit breaker upstream is not in RELT mode, at the normal mode selectivity trip time-delay determined at 850.

If it is determined at 830 that there is a third circuit breaker upstream from the second circuit breaker, then at 835 the third circuit breaker upstream is identified. Thereafter, at 840, it is determined if the third circuit breaker upstream identified at 835 is in a RELT mode, and if so, then at 860 its RELT mode trip time-delay is applied.

If at 840, it is determined that the third circuit breaker upstream identified at 835 is not in a RELT mode, then at 850 the selectivity delay the third circuit breaker upstream is determined by adding the normal mode ZSI trip time-delay for the third circuit breaker upstream, and the RELT mode trip time-delay of the second circuit breaker upstream determined at 860.

The embodiments of FIGS. 1-3 describe a system for implementing ZSI routine 426 at CCPU 28. However, it is contemplated by the present disclosure that the use of dynamic delay times for opening of circuit breakers 14 and/or the use of ZSI routine 426 can be implemented in other ways such as, for example, in a distributed control system with supervision by CCPU 28 or a distributed control system with peer to peer communications. In such distributed control systems, the dynamic delay times for the upstream circuit breakers 14 can also be determined and communicated to the upstream circuit breakers and/or circuit breaker actuators operably connected to the breakers.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A method of protecting a circuit having at least a first circuit breaker and a second circuit breaker arranged upstream of said first circuit breaker, said first circuit breaker having configuration settings selectable between a normal mode and an alternate mode, the alternate mode setting including a reduced energy let-thru (RELT) mode setting having a RELT mode trip time delay, the method comprising:
   determining with at least one processing unit if said first circuit breaker is configured in said RELT mode;
   determining with said at least one processing unit a dynamic delay time for opening said second circuit breaker, wherein said dynamic delay time is based at least in part on said RELT mode trip time delay of said first circuit breaker; and
   triggering said second circuit breaker to open after said dynamic delay time has elapsed.

2. A method of protecting a circuit having at least a first circuit breaker and a second circuit breaker arranged upstream, of said first circuit breaker, said first circuit breaker configured to provide a selectivity trip time-delay, said second circuit breaker having configuration settings selectable between a normal mode and an alternate mode, the alternate mode setting including a reduced energy let-thru (RELT) mode setting having, a RELT mode trip time delay, the method comprising:
   determining with at least one processing unit if said second circuit breaker is configured in said RELT mode;
   overriding with said at least one processing unit said selectivity trip time-delay for opening said second circuit breaker; and
   triggering said second circuit breaker to open after said RELT mode trip time delay has elapsed.

3. A system for protecting a circuit having a first circuit breaker arranged downstream of a second circuit breaker, said first circuit breaker configured to provide a selectivity trip time-delay, said second circuit breaker having configuration settings selectable between a normal mode and an alternate mode, the alternate mode setting including a reduced energy let-thru (RELT) mode setting haying a RELT Mode trip time delay, the system comprising:
   a network and at least one control processing unit configured to operatively control said first circuit breaker and said second circuit breaker, said network being communicatively coupled to said circuit, said first circuit breaker, said second circuit breaker and said at least one control processing unit,
   wherein said at least ne control processing unit is configured to
   (a) open at least one of said first and said second circuit breakers if a fault is detected in said circuit,
   (b) determine a dynamic delay time for opening said second circuit breaker if said fault is detected in said circuit, wherein said dynamic delay time is based at least in part on said RELT mode trip time delay of said first circuit breaker, (c) determine if said first circuit breaker is set in said RELT mode, and if so, (d) delay opening, said second circuit breaker until after said dynamic delay time has elapsed.

4. A system for protecting a circuit having a first circuit breaker arranged downstream of a second circuit breaker, said first circuit breaker having configuration settings selectable between a normal mode and an alternate mode, the alternate mode setting including a reduced energy let-thru (RELT) mode setting having a RELT mode trip time delay, the system comprising:

a network and at least one control processing unit configured to operatively control said first circuit breaker and said second circuit breaker, said network being communicatively coupled to said circuit, said first circuit breaker, said second circuit breaker and said at least one control processing unit, wherein said at least one control processing unit is configured to (a) open at least one of said first and said second circuit breakers if a fault is detected in said circuit, (b) determine a dynamic delay time for opening said second circuit breaker if said fault is detected in said circuit, (c) determine if said second circuit breaker is set in said RELT mode, and if so, (d) override said selectivity trip time-delay for opening said second circuit breaker; and (e) issue a signal to cause said second circuit breaker to open after said RELT mode trip time delay has elapsed.

5. The method of claim 1 or 2, wherein the at least one processing unit is a central control processing unit.

6. The system of claim 3 or 4, wherein said at least one control processing unit is further configured for supervisory control of said first and said second circuit breakers.

* * * * *

UNITED STATES PATENT AND TRADEMARK OFFICE
CERTIFICATE OF CORRECTION

PATENT NO. : 8,385,035 B2
APPLICATION NO. : 12/837958
DATED : February 26, 2013
INVENTOR(S) : Narel et al.

Page 1 of 1

It is certified that error appears in the above-identified patent and that said Letters Patent is hereby corrected as shown below:

On the Title Page, in Item (57), under "ABSTRACT", in Column 2, Line 6, delete "let-thru" and insert -- let-through --, therefor at each occurrence throughout the patent.

On the Title Page, in Item (57), under "ABSTRACT", in Column 2, Line 9, delete "a." and insert -- a --, therefor.

In the Specifications:

In Column 7, Line 6, delete "820" and insert -- 825 --, therefor.

In the Claims:

In Column 8, Line 39, in Claim 2, delete "ha ving," and insert -- having --, therefor.

In Column 8, Line 54, in Claim 3, delete "haying a RELT Mode" and insert -- having a RELT mode --, therefor.

In Column 8, Line 62, in Claim 3, delete "least ne" and insert -- least one --, therefor.

In Column 9, Line 6, in Claim 3, delete "opening," and insert -- opening --, therefor.

Signed and Sealed this
Twenty-eighth Day of May, 2013

Teresa Stanek Rea
*Acting Director of the United States Patent and Trademark Office*